(12) United States Patent
Villar

(10) Patent No.: US 11,181,094 B2
(45) Date of Patent: Nov. 23, 2021

(54) WIND BLADE COMPONENT BONDING FIXTURE

(71) Applicant: TPI Composites, Inc., Warren, RI (US)

(72) Inventor: Michael Villar, Bacolod (PH)

(73) Assignee: TPI Composites, Inc., Warren, RI (US)

( * ) Notice: Subject to any disclaimer, the term of this patent is extended or adjusted under 35 U.S.C. 154(b) by 365 days.

(21) Appl. No.: 16/439,134

(22) Filed: Jun. 12, 2019

(65) Prior Publication Data

US 2020/0003176 A1 Jan. 2, 2020

Related U.S. Application Data

(60) Provisional application No. 62/684,031, filed on Jun. 12, 2018.

(51) Int. Cl.
| | |
|---|---|
| *F03D 1/06* | (2006.01) |
| *B29C 65/48* | (2006.01) |
| *B29C 33/30* | (2006.01) |
| *F03D 13/40* | (2016.01) |
| *B29C 65/52* | (2006.01) |
| *B21D 53/78* | (2006.01) |
| *B29C 65/78* | (2006.01) |
| *B29L 31/08* | (2006.01) |

(52) U.S. Cl.
CPC .......... *F03D 1/0675* (2013.01); *B21D 53/78* (2013.01); *B29C 33/307* (2013.01); *B29C 65/483* (2013.01); *B29C 65/52* (2013.01); *B29C 65/7841* (2013.01); *F03D 13/40* (2016.05); *B29L 2031/085* (2013.01); *F05B 2260/02* (2013.01)

(58) Field of Classification Search
None
See application file for complete search history.

(56) References Cited

U.S. PATENT DOCUMENTS

| | | | |
|---|---|---|---|
| 2012/0133066 A1* | 5/2012 | Pascula | B29C 33/308 |
| | | | 264/40.1 |
| 2012/0175807 A1 | 7/2012 | Galdeano et al. | |
| 2013/0039767 A1 | 2/2013 | Schrickel et al. | |
| 2013/0119002 A1 | 5/2013 | Frederiksen | |
| 2014/0193255 A1 | 7/2014 | Hancock et al. | |
| 2014/0322023 A1* | 10/2014 | Tapia | B23P 15/04 |
| | | | 416/223 R |
| 2015/0290752 A1 | 10/2015 | Voigt et al. | |
| 2015/0369209 A1 | 12/2015 | Datta et al. | |
| 2016/0221488 A1 | 8/2016 | Thomsen et al. | |

FOREIGN PATENT DOCUMENTS

WO WO-2017/121450 A1 7/2017

OTHER PUBLICATIONS

International Search Report and Written Opinion for International Application No. PCT/US19/36745 dated Sep. 5, 2019.

* cited by examiner

*Primary Examiner* — Barbara J Musser
(74) *Attorney, Agent, or Firm* — Foley Hoag LLP; Stephen J. Kenny

(57) ABSTRACT

The disclosed subject matter provides a system and method for facilitating bonding of various turbine blade components, including trailing edge inserts, or flatbacks, to the trailing edge of a wind turbine blade. The system disclosed herein ensures a consistent force is applied from root to top thereby preventing defects, e.g. paste voids, from forming. Additionally, a consistent bonding gap can be achieved due to the consistent application of force from the root to tip of the blade.

20 Claims, 22 Drawing Sheets

WIND BLADE COMPONENT BONDING FIXTURE

CROSS REFERENCE TO RELATED PRIORITY APPLICATION

This application claims the benefit of priority under 35 USC 119 to Provisional application No. 62/684,031 filed Jun. 12, 2018, the entire contents of which are hereby incorporated by reference.

BACKGROUND OF THE DISCLOSED SUBJECT MATTER

Field of the Disclosed Subject Matter

The disclosed subject matter relates to a system and corresponding method for the manufacture of fiber reinforced polymer composite manufacturing, e.g., wind turbine blades. Particularly, the present disclosed subject matter provides a system and method for facilitating bonding of various turbine blade components, including trailing edge inserts, or flatbacks, which provides greater blade efficiency and increased energy capture.

Description of Related Art

As the use of wind turbines continues to grow as a source of alternative or "clean" energy, technological advances in the art have allowed for increased sizes of wind turbines and new designs of wind turbine components. However, as the physical sizes and availability of wind turbines increase, so does the need to balance the cost of manufacturing and operating wind turbines to further allow wind power to be cost-competitive with other energy sources. The size, shape, and weight of rotor blades are factors that contribute to energy efficiencies of wind turbines. For example, an increase in rotor blade size increases the energy production of a wind turbine, while a decrease in weight also furthers the efficiency of a wind turbine.

Furthermore, as rotor blade sizes grow, extra attention needs to be given to the structural integrity of the rotor blades. Presently, large commercial wind turbines are capable of generating between one and one-half megawatts to five megawatts of power. Accordingly, efforts to increase rotor blade size, decrease rotor blade weight, and increase rotor blade strength, while also improving rotor blade aerodynamics, aid in the continuing growth of wind turbine technology and the adoption of wind energy as an alternative energy source.

In order to achieve higher performing blades with increased annual energy production, "flatback" airfoils have been employed for the inboard section of the blade. Compared to thick conventional, sharp trailing-edge airfoils, a flatback airfoil with the same thickness exhibits increased lift and reduced sensitivity to fouling. These previous designs have incorporated the flatback concept into the skin, by opening up the trailing edge of the airfoil uniformly along the camber line. While offering improved performance, the structure of these previous designs is not reliable in all circumstances.

Some exemplary airfoil designs which include a flatback component are disclosed in U.S. Pat. Nos. 9,151,270 and 8,092,187, the entire contents of which are hereby incorporated by reference. Installation and assembly of these flatback components present a number of challenges in that they are typically lifted and pushed against the bond surface of the blade skin via manual force. This results in an uneven force, and consequently paste voids between the assembled components.

There thus remains a need for an efficient and economic method and system for handling and assembling the flatback component to facilitate manufacture of the wind turbine blade.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes: an apparatus for assembling wind turbine blade components comprising: a main body portion, the main body portion including a plurality of interconnected struts; at least one arm, the at least one arm including a plurality of interconnected struts, the at least one arm configured to engage a leading edge of a mold; at least one leg, the at least one leg including a plurality of interconnected struts, the at least one leg configured to engage a trailing edge of a mold; a template, the template configured to hold a blade component; and an actuator, the actuator configured to apply a force to the blade component.

In some embodiments, the blade component is a flatback insert, and the force applied by the actuator is directed towards the trailing edge of the blade.

In some embodiments, the arm can rotate with respect to the main body portion. In some embodiments, two arms are included, the first arm disposed at a first end of the main body portion, the second arm spaced from the first arm and having a greater length than the first arm. In some embodiments, at least one leg is longitudinally spaced from the at least one arm.

In some embodiments, at least one leg is removably attached to the main body portion.

In some embodiments, shackles are included on a top surface of the main body, the shackles configured to engage a vertical hoist mechanism.

In some embodiments, the main body has a first side and a second side, both the first and second sides disposed interior of the leading and trailing edges of the mold.

In some embodiments, at least one actuator is connected to a bottom surface of the main body portion. In some embodiments, the at least one actuator is connected to the template. In some embodiments, a plurality of actuators are disposed equidistantly from adjacent actuators. In some embodiments, the at least one actuator is a pneumatic piston. In some embodiments, the at least one actuator is disposed between the leading edge and trailing edge. In some embodiments, the at least one actuator is adjustable in distance relative to the main body portion.

In some embodiments, the template engages a blade component along a top edge thereof. In some embodiments, a blade component holder is connected to a bottom of the main body portion.

In some embodiments, at least one leg extends laterally from the main body portion. In some embodiments, the at least one arm extends laterally from the main body portion. In some embodiments, the main body portion, the at least one arm and the at least one leg are discrete assemblies.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIG. 5 is a bottom perspective view of FIG. 4.

DETAILED DESCRIPTION OF AN EXEMPLARY EMBODIMENT

Reference will now be made in detail to exemplary embodiments of the disclosed subject matter, an example of which is illustrated in the accompanying drawings. The method and corresponding steps of the disclosed subject matter will be described in conjunction with the detailed description of the system.

A blade for the use in the generation of power has a leading edge and a trailing edge. A first shell portion of the blade extends from the leading edge to the trailing edge. A second shell portion of the blade also extends from the leading edge to the trailing edge. A root portion of the blade is positioned proximate the wind turbine and a tip portion which extends from the root portion away from the wind turbine. In some wind blade designs, a trailing edge insert, or "flatback", is positioned between the first shell portion and the second shell portion.

The use of the trailing edge insert to provide a flatback profile has many advantages, including, but not limited to, significant improvement in the aerodynamic performance of airfoils and increased energy capture in the root design region. The utilization of the trailing edge insert also adds structural stiffness to the blade. Additionally, the use of the trailing edge insert provides a high lift aerodynamic design that allows for greater blade efficiency by utilizing short chord lengths and thick chord profiles. As blade performance requirements are driven higher, this design offers increased performance, particularly near the root region, in a lower weight package.

While the use of the trailing edge insert is described for use with the wind turbine blade, the trailing edge insert may be used in other blade configurations and for blades which operate in other environments, such as fluids. Additionally, the fixture disclosed herein can be employed to facilitate installation of a variety of wind turbine blade components, e.g. spar cap and shear webs, and is not limited to flat back installations. Reference to "flatback" herein is for convenience and purpose of illustration, not limitation.

Figure 1:
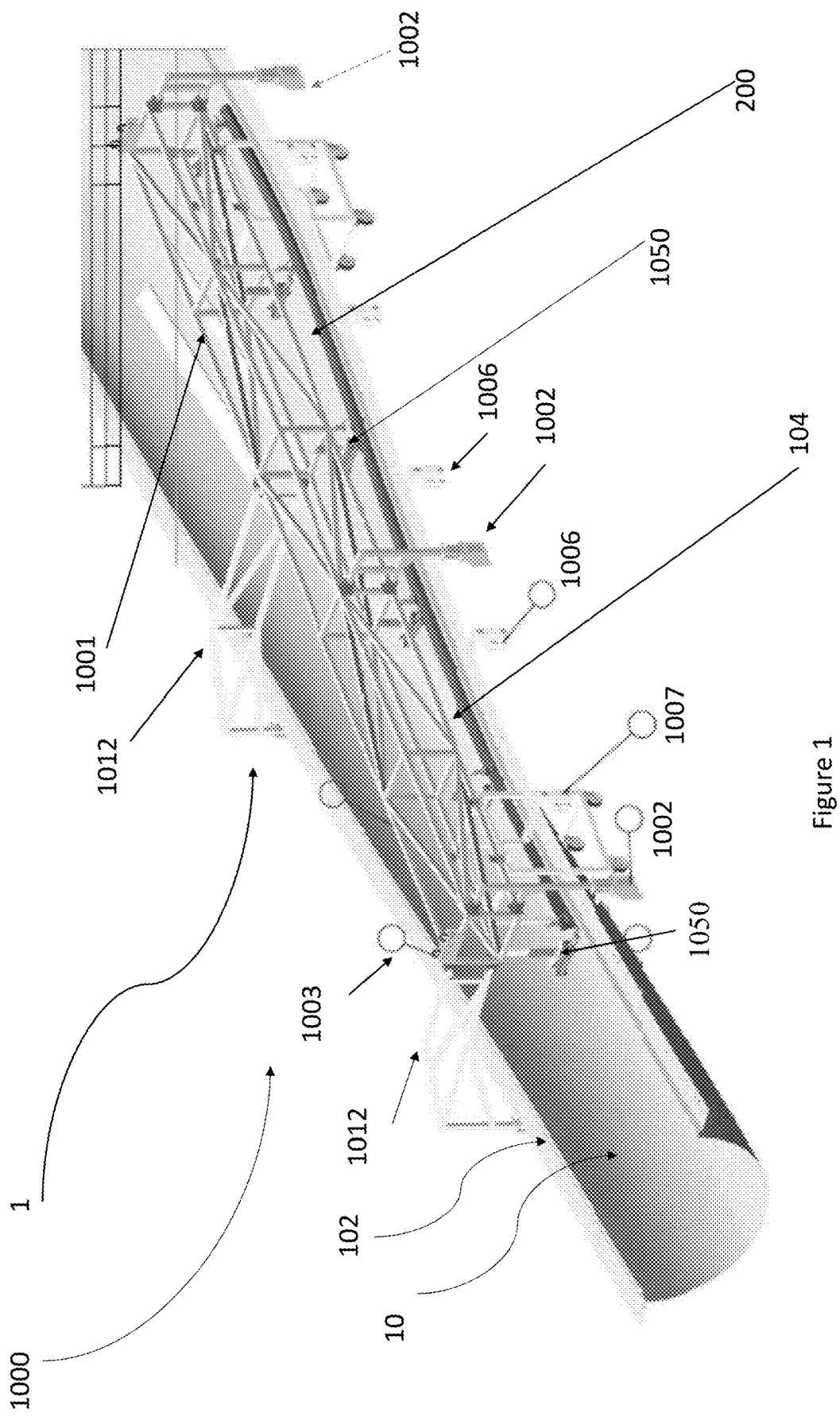
FIG. 1 depicts an exemplary embodiment of the blade assembly apparatus including a representative half-blade mold and flatback component.

As shown in FIG. 1, a pressure side shell 100 of wind turbine blade (and underlying mold) is depicted, having a leading edge 102 and a trailing edge 104. A trailing edge insert, or "flatback" 200, is mounted to the pressure side shell portion 100 by periodically spaced adhesive joints. Likewise, the trailing edge insert 200 is mounted to the suction side shell portion by periodically spaced adhesive joints. In some embodiments, the adhesive joints are formed by dispensing a continuous bead of adhesive at desired locations on either the flatback 200 or skin of the blade within the mold. Additionally or alternatively, the bonding of the flatback 200 to the blade skin can include use of a guide rail wherein a paste shoe is guided through in applying paste to the blade skin. This guidance can be provided manually or remotely. These adhesive joints are formed between surfaces via contact with adhesive compositions or other materials known in the art for joining composite materials. Suitable adhesive compositions include, but are not limited to, epoxy, polyester, methylacrylate, vinylester or other adhesive resin.

In accordance with an aspect of the disclosure, a fixture (1000) is provided which retrieves a flatback insert (200) from storage, delivers the flatback to the trailing edge side (104) of a mold 1), and installs the flatback at the appropriate position within the mold (1) for bonding and final assembly. Additionally, the fixture (1000) can maintain the flatback (200) at a fixed orientation with respect to the blade (104) and or mold (10). For example, the fixture (1000) can maintain the flatback (200) with respect to the surface of the blade via the legs (1002) of the fixtures which are received through the attachments on the mold frame. Also a stopper can be provided to oppose the push of the flatback (200) from the pneumatic cylinders.

As shown in FIG. 1, the fixture 1000 includes a plurality of interconnected truss members joined in a variety of configurations to accommodate blades of alternating dimensions. The fixture (1000) includes: a main body portion (1001); arms (1012) extending from the main body portion to engage the leading edge of the mold (1); a plurality of legs (1002) disposed outside the mold (1) and extending downward to engage the leading edge of the mold (and optionally, the floor); a plurality of shackles (1003) (for raising/lowering the fixture (1000); a double limb chain rigging (for engaging the shackles (1003) for raising and lowering the fixture relative to the mold (1)); an actuator with guider (1050); a flatback holder (1006); and a flatback storage rack (1007).

The fixture 1000 is configured to be positioned inside and above the blade mold (10), with adjustable arms (1012) that engage the flanges of the mold (10) along the leading and adjustable legs (1002) that engage flanges on the trailing edge of the mold, and permit precise positioning and installation of the flatback with respect to the blade trailing edge, as described in further detail below.

Fixture Main Body Portion (1001)

The fixture main body portion can be constructed of a variety of materials and sizes with sufficient structural integrity to support the weights associated with the various components of the wind turbine blade. For example, the fixture main body (1001) can be formed of plurality of metal, e.g. steel, trusses which can be welded together to form a generally rectangular structure, as shown FIGS. 1-3. The fixture (1001) can be sized to have a length which corresponds to the length of the flatback insert (200), as shown. In some embodiments, the fixture can extend beyond the boundaries of the flatback insert (200) and reach from the root to the tip of the blade.

The main (1001) body can be formed with longitudinally (e.g. spanwsie) extending struts (1001a) which join a series (e.g. six, as shown) of perpendicular frames (1001b). Additionally, torsion resistance beams (1001c) can extend diagonally between frames, as shown in FIGS. 1-6. In the exemplary embodiment shown, the frames (1001b) are equally spaced along the length of the main body (1001).

Fixture Arms (1012)

The fixture also includes an arm (1012) which extend from the main body to the leading edge of the mold (1). The arms (1012) can include a mounting bracket for coupling to the leading edge of the mold. This arm (1012) serves as a stabilizing force during handling and installation of the flatback insert (200). Additionally, the arm (1012) can locate the fixture to the skin mold and serve as a datum to reference the rest of the locating devices attached to the fixture.

Figure 6:
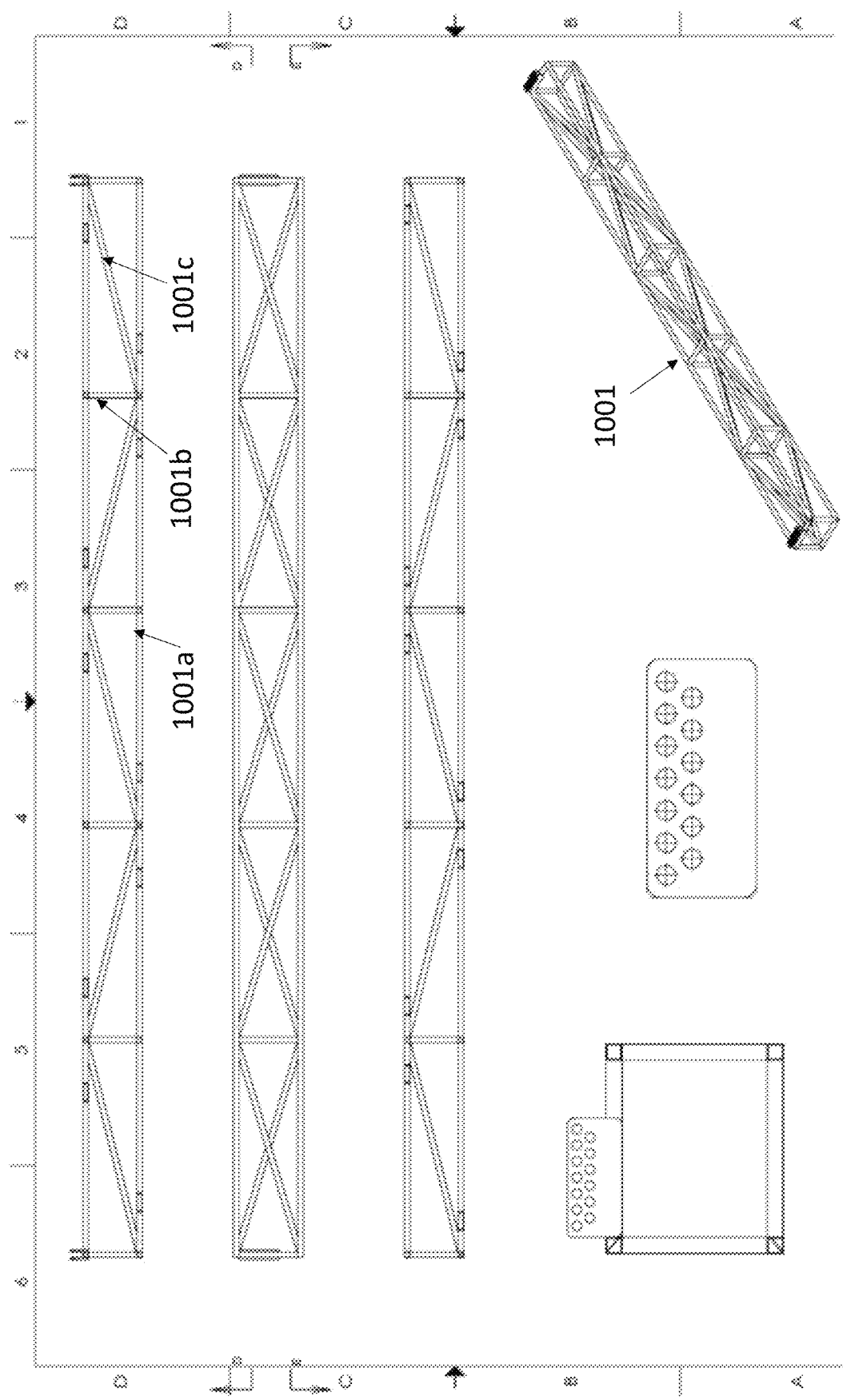
FIG. 6 are exemplary views of the main body of the assembly apparatus disclosed herein.

In the exemplary embodiment shown, two arms (1012) are provided which are distributed along the fixture length. A first arm (1012) is located at front end of the fixture (1000), and the second arm is spaced distance therefrom, coinciding with the location of the fourth frame (1001b) of the main body (1001) (as shown in FIG. 6). Accordingly, the length of the arms can vary to accommodate the varying mold/blade chord, with the first arm (1012a) being shorter than the second arm (1012b) located closer to the tip (i.e. where the mold/blade chord is larger than proximate the root region of the blade).

Figure 10:
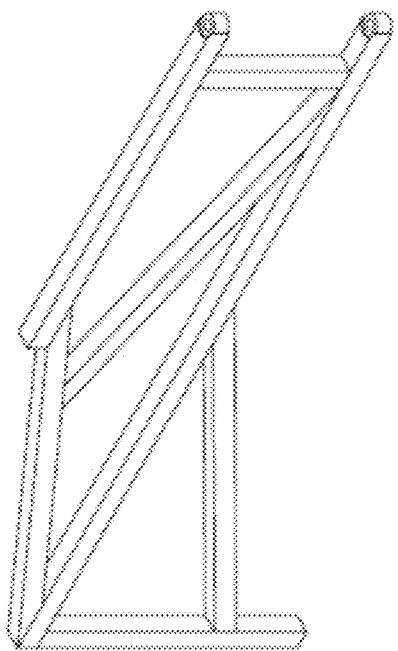
FIGS. 10-11 are exemplary views of the arms of the assembly apparatus disclosed herein.
Figure 10:
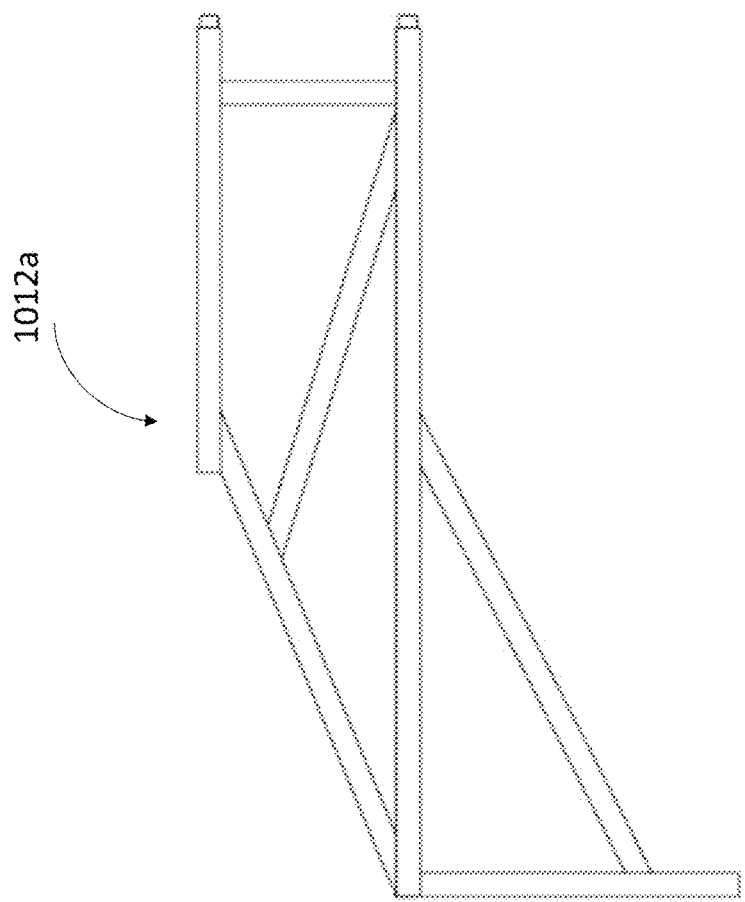
Figure 11:
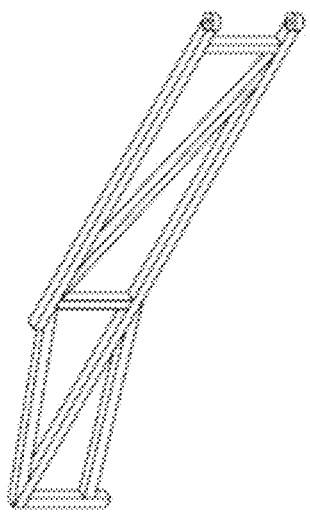
Figure 11:
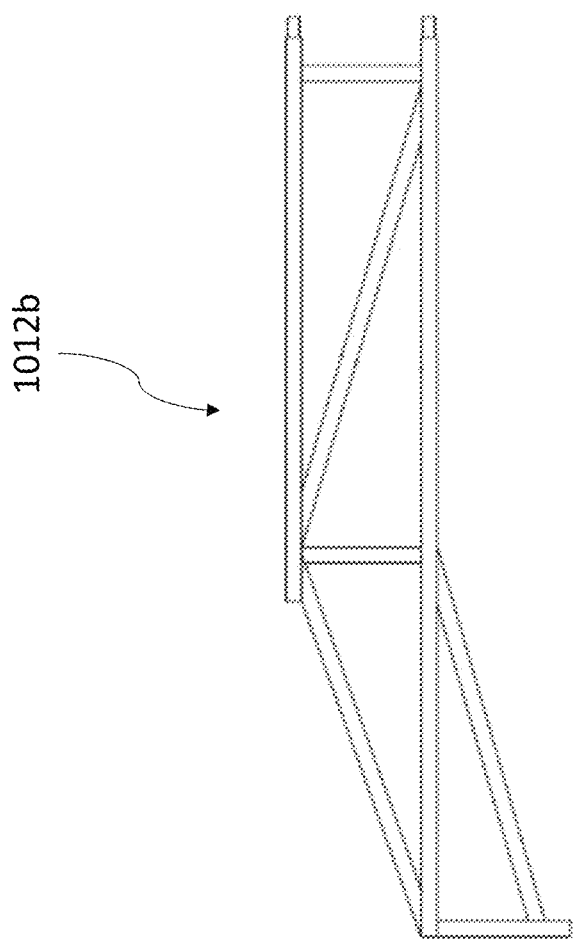

Each arm includes a first portion extending from, and co-planar with a top surface of the main body (1001), and a second portion which slopes downward towards the leading edge of the mold (1), as shown in FIGS. 10-11. The arms (1012) can be formed with a pair of parallel struts with diagonally torsion resistance beams (1012c) extending diagonally between struts, as shown. In some embodiments all struts and beams of the arms (1012) can be vertically aligned so as to be coplanar (e.g. occupy a single vertical plane)

Additional arms can be employed to increase rigidity and/or provide additional reference points for ensuring proper positioning of the flatback insert (200) with respect to the mold, if desired. Also, in some embodiments, the arms (1012) can be repositioned with respect to the main body (1001), e.g., the arm (1012a) can be relocated to the third or fifth frame (1001b), of FIG. 6 if desired).

Also, the arms 1012 can include a hinge or pivot mechanism at the union of the arms and fixture body (1001) to allow the arm to rotate with respect to the main body of the fixture to an angle of approximately 90 degrees. Additionally, the arms 1012 can be rotated to be in a parallel orientation with respect to the body truss (1001a) to provide a more compact configuration better suited for movement and storage. In operation, as the fixture (1000) is lowered into the frame of the mold, the arms (1012) are rotated outward and into position to engage the leading edge of the mold flange.

Fixture Legs (1002)

The fixture also includes legs (1002) which extend from the main body (1001) to the trailing edge of the mold (1). The legs (1002) can include a mounting bracket for coupling to the trailing edge of the mold.

In the exemplary embodiment shown, three legs (1002) are provided which are distributed along the fixture length. A first leg (1002) is located at front end of the fixture (1000), coincident with the first arm (1012); the second leg is spaced distance therefrom, coinciding with the location of the third frame (1001b) of the main body (1001) (as shown in FIG. 6); the third leg (1002) is disposed at the distal (tip) end of the main body (1001). Similarly to the arms described above, the dimensions of the legs (1002) can vary to accommodate the varying mold/blade chord.

Figure 7:
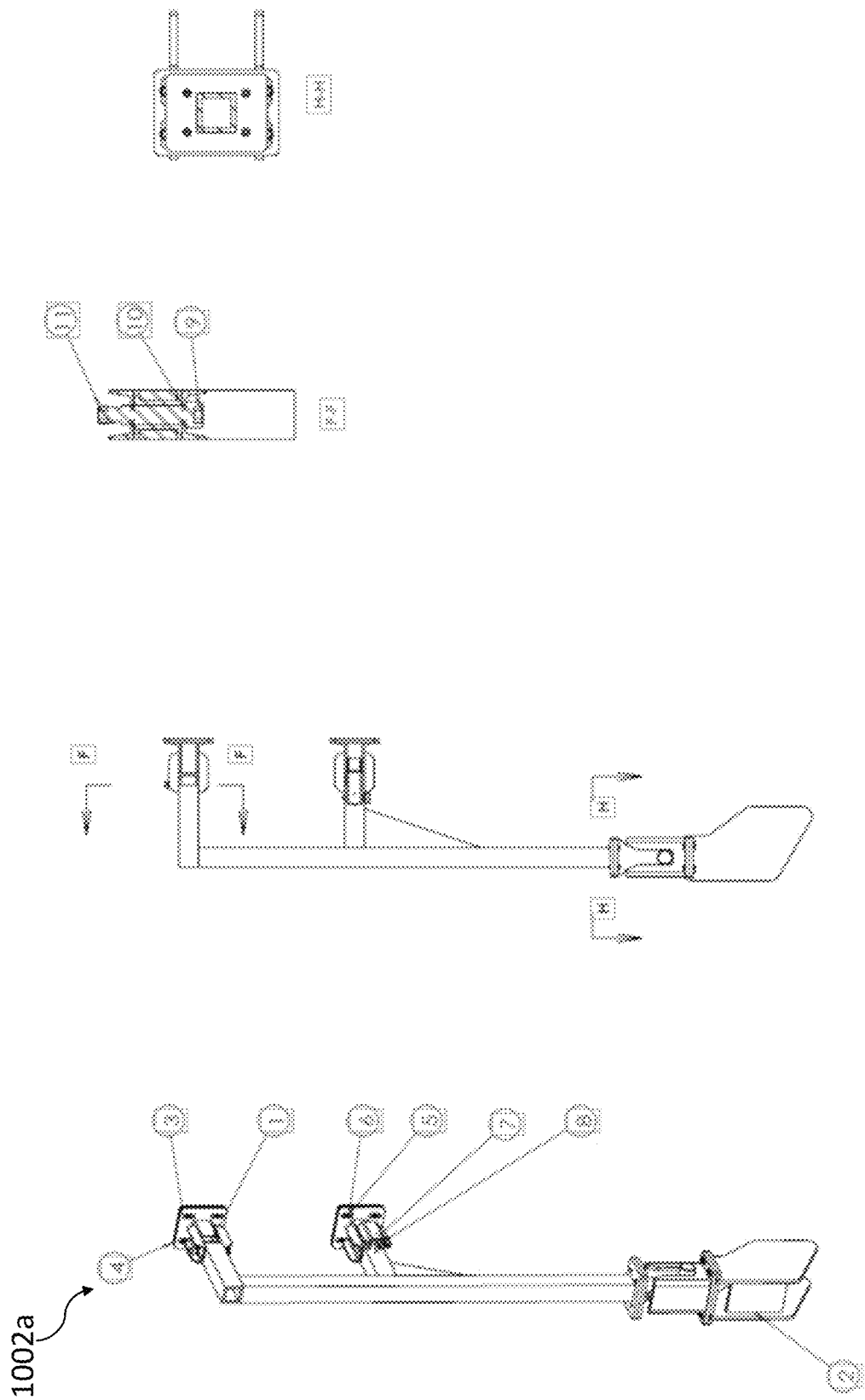
FIGS. 7-9 are exemplary views of the legs of the assembly apparatus disclosed herein.
Figure 8:
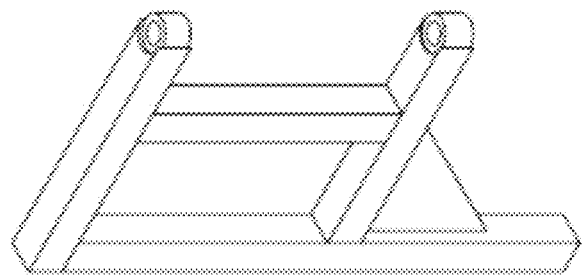
Figure 8:
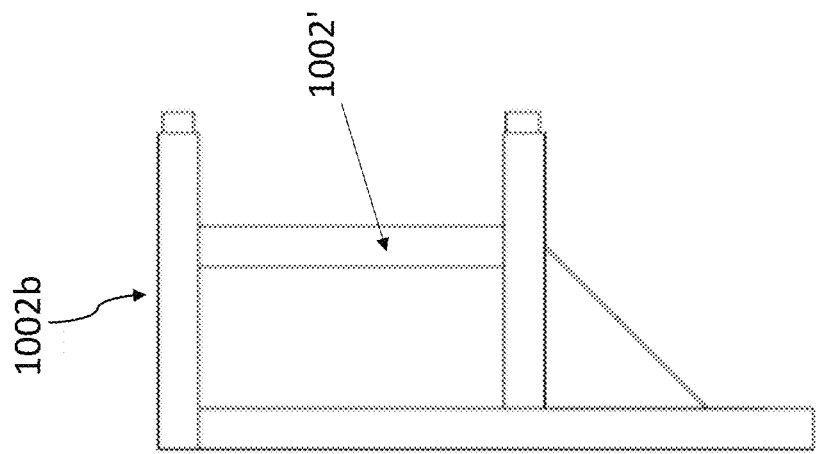
Figure 9:
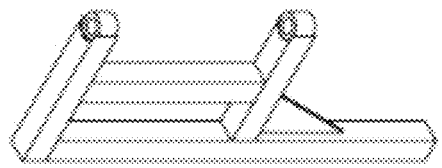
Figure 9:
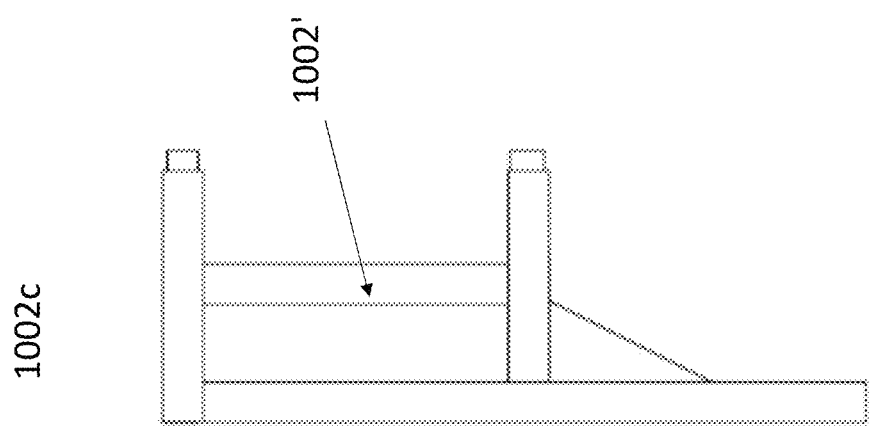

Each leg (1002) includes a vertical strut having a pair of perpendicularly extending struts configured to attach to the main body (1001). The bottom of the vertical strut includes a mounting bracket for coupling to the leading edge of the mold, as shown in FIG. 7. As shown in FIG. 7, the first leg (1002a) can have an F-shape construction, while the second and third legs (1002b, 1002c) have an additional vertical strut (1002') included for additional rigidity. The legs (1002) can be releasably attached to the main body (1001), e.g. via a bracket and pin connection as shown in FIG. 7. In some embodiments all struts and beams of the arms (1012) can be aligned so as to be coplanar.

Additional legs can be employed to increase rigidity and/or provide additional reference points for ensuring proper positioning of the flatback insert (200) with respect to the mold, if desired. Also, in some embodiments, the legs (1002) can be repositioned with respect to the main body (1001), e.g., the legs (1002) can be relocated to the second, fourth or fifth frame (1001b), of FIG. 6 if desired.

Shackles (1003)

Figure 2:
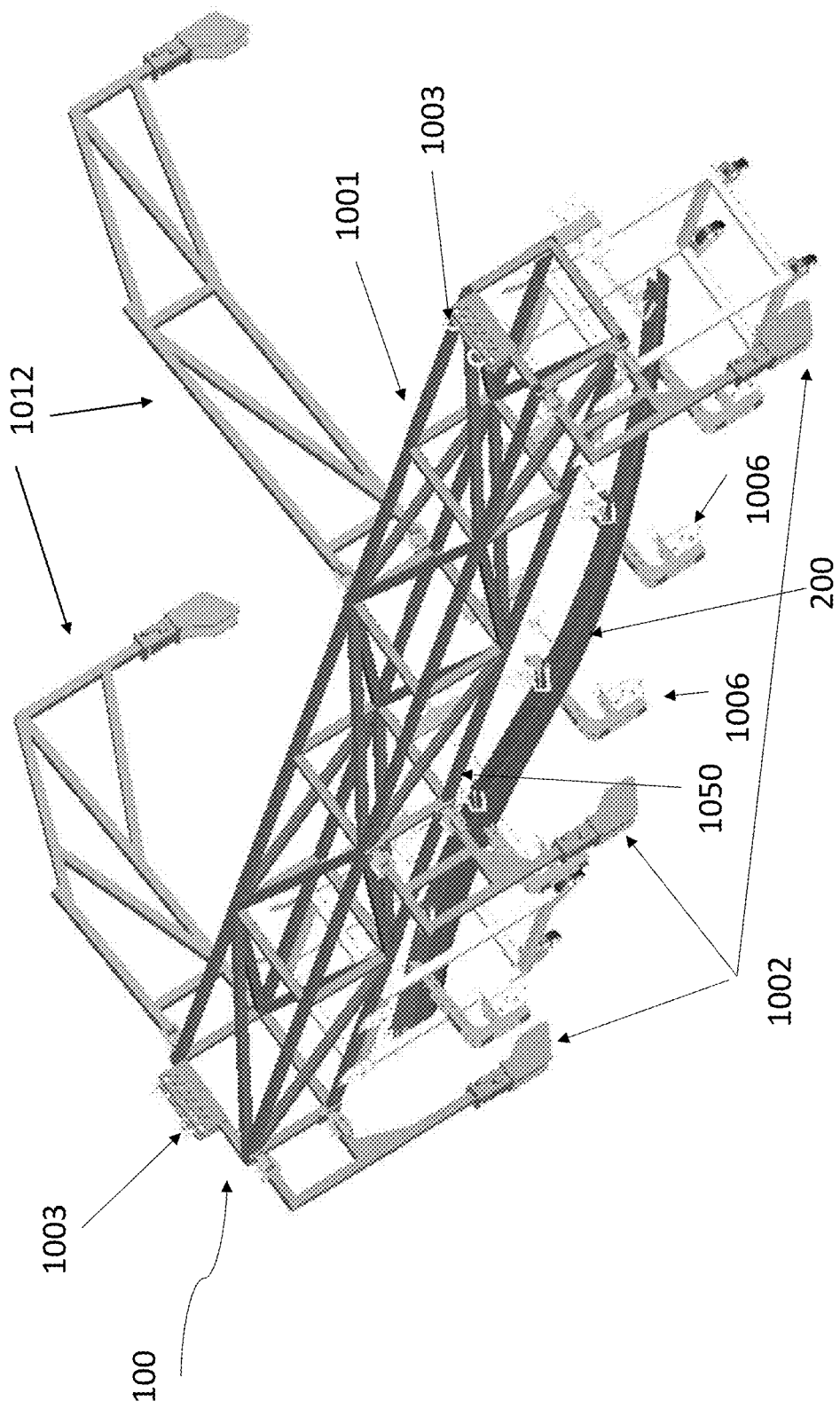
FIGS. 2-5 depict an exemplary embodiment of the blade assembly apparatus including flatback component (i.e. blade mold removed for clarity)
Figure 3:
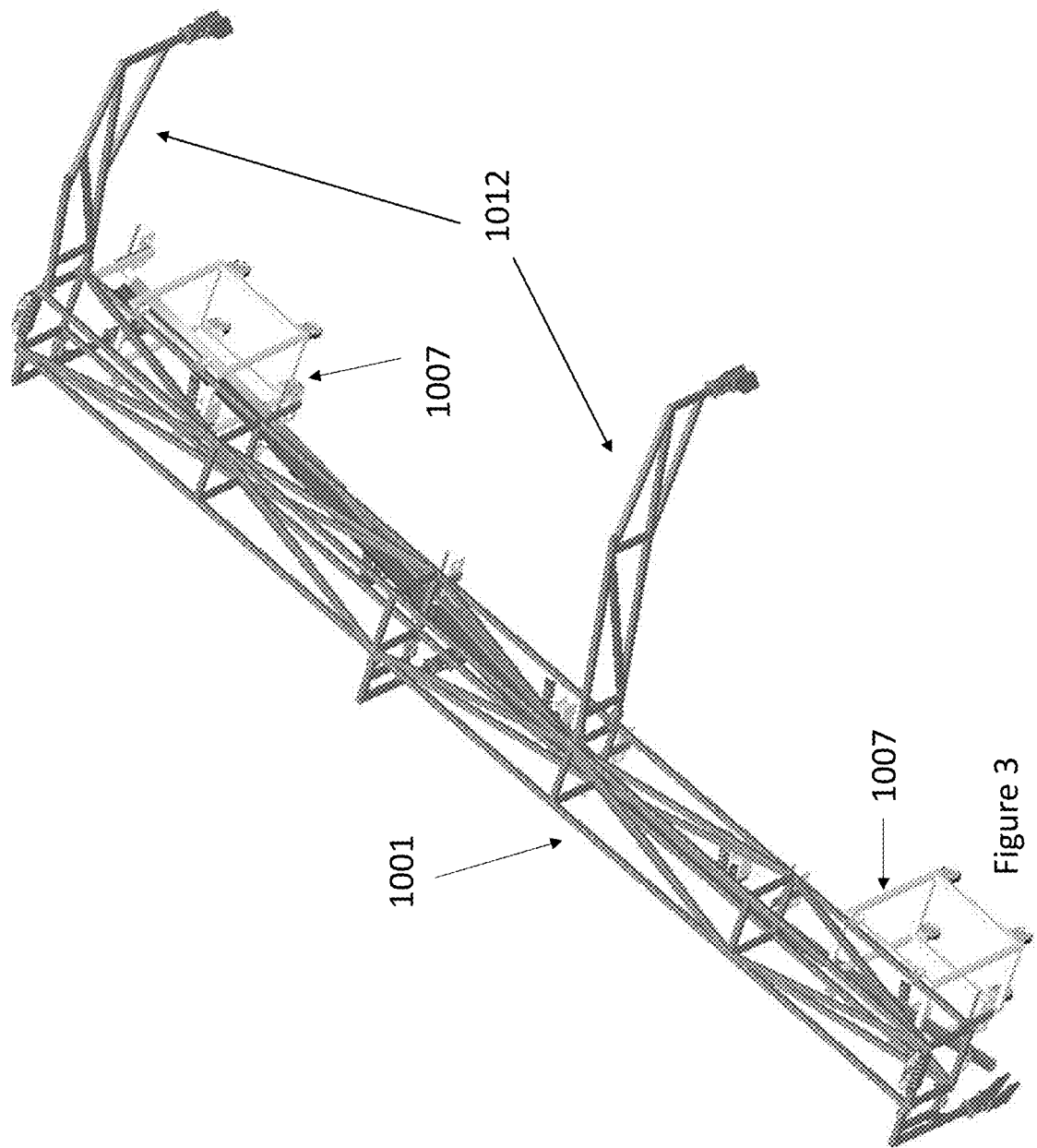
Figure 4:
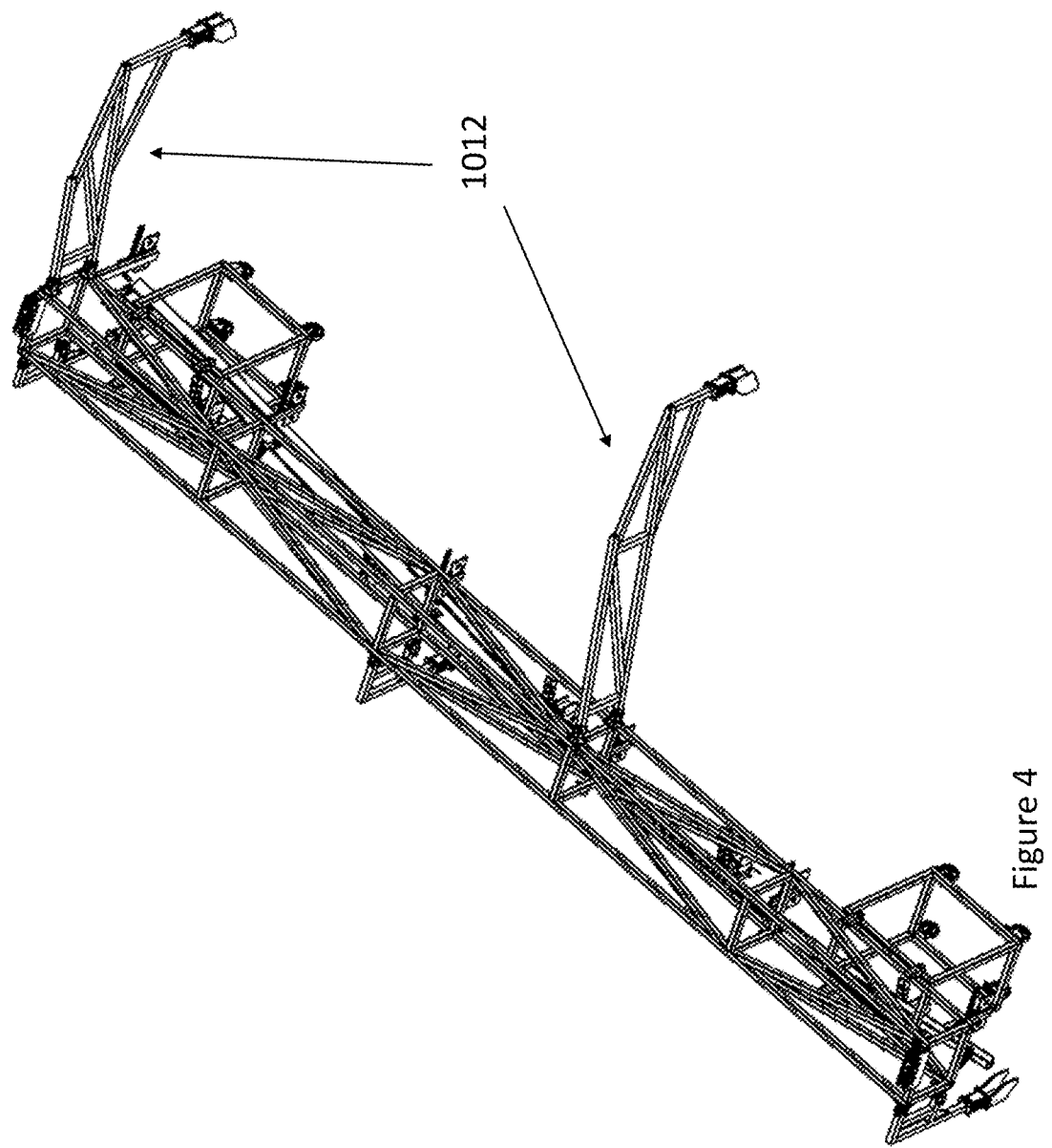
Figure 5:
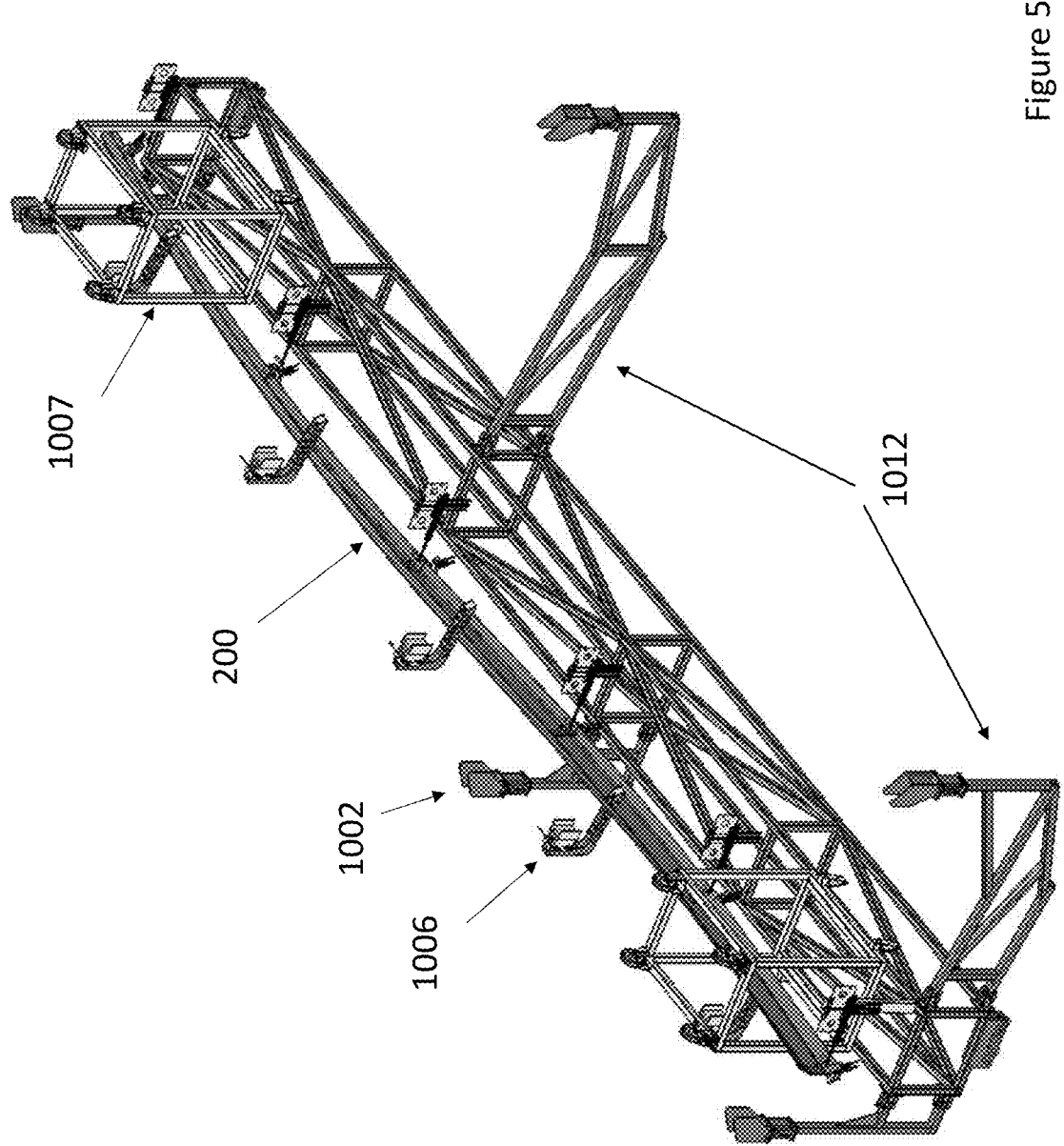
Figure 22:
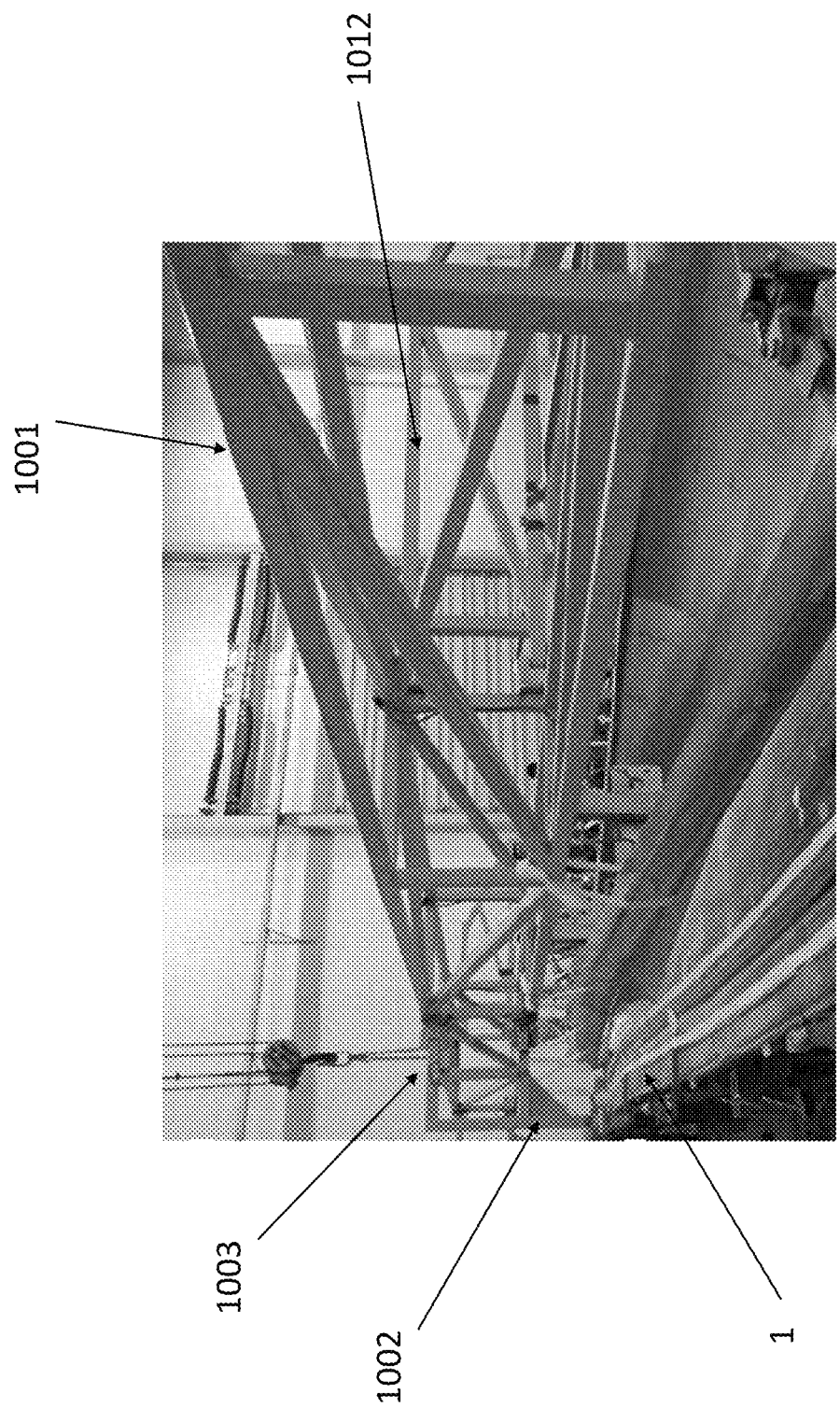
FIG. 22 is an exemplary view of the assembly apparatus disclosed herein positioned above and within a blade mold.

As best shown in FIGS. 1-2 and 22, the fixture includes a plurality of connection members, e.g. shackles (1003), which allow the fixture (1000) to be lifted and descended into a desired location on the mold (1). The fixture can be lifted, e.g. via cables and pulley system, transported to a desired location above the mold (1), and lowered to engage the mold flanges for installation of the flatback 200. In the exemplary embodiment shown, a first pair of connection members (1003) are located at a first end of the main body (e.g. coupled to the top surface of frame 1001b), and a second pair of connection members (1003) are located at the opposing end of the main body. Additional connection members (1003) can be employed along the main body, if so desired to provide additional load distribution channels for the fixture when suspended in air.

In accordance with an aspect of the disclosure, the fixture (1000) does not make contact with the blade skins, but instead rests only on the outer mold flanges. The vertical movement can be advantageous in that it allow for removal, and storage at the elevated height, when the fixture is not in use and/or when maintenance needs to be performed on the shop floor.

In some embodiments, the fixture (1000) can be translated along the span of the blade mold (1) to be placed in position for attaching the flatback (200) to the blade. Additionally or alternatively, the fixture can be constructed around the blade mold (e.g. erected as a scaffolding which engages the floor).

Double Limb Chain Rigging

As shown in FIG. 22, a chain or cable can be included to facilitate lifting, and supporting during transport, the fixture (1000). In some embodiments the chain is a double limb series of interconnected links. In other embodiments, a cable or rope is provided. The lifting mechanism (chain, rope, cable, etc.) can be provided on both ends to engage the connection members (shackles 1003) and raised/lowered in unison such that the fixture (1000) remains oriented horizontally, i.e. parallel to the shop floor.

In some embodiments, the fixture (1000) can be lowered in a tilted orientation such that the legs (1002) can be engaged with the trailing edge mold flange first, followed by the arms (1012) engaging the leading edge mold flange second; or vice versa. Similarly, the fixture (1000) can be lowered in an angled orientation such that the root-side of the fixture engages the mold prior to the tip-side of the fixture.

Actuator Guider (1050)

As shown in FIG. 1, the fixture includes a plurality of actuation guiders (1050) spaced along the span of the fixture (1000). In the exemplary embodiment shown, six actuation guiders (1050) are distributed along the fixture length with equidistant spacing (e.g. one actuation guider (1050) located at each frame (1001*b*) of the main body) however the number and distribution (e.g. uniform, gradient, etc.) of actuation guiders (1050) can be varied as desired to accommodate blades, and/or flatback inserts, of alternative geometries.

Figure 12:
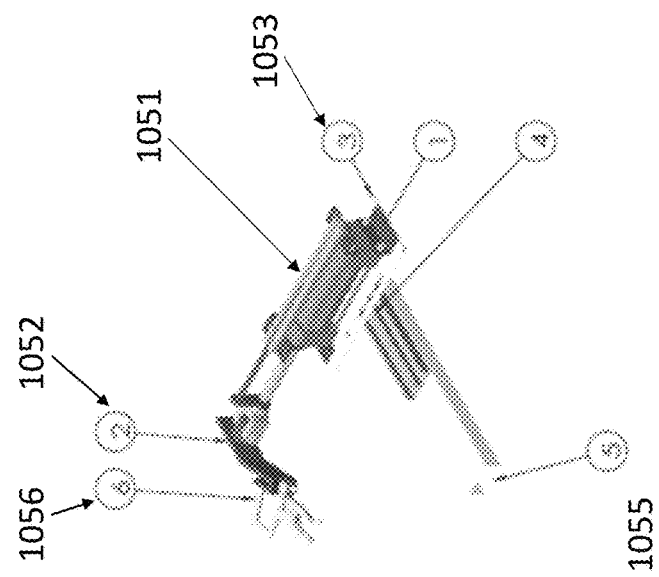
FIGS. 12-13 are exemplary views of the actuator of the assembly apparatus disclosed herein.
Figure 12:
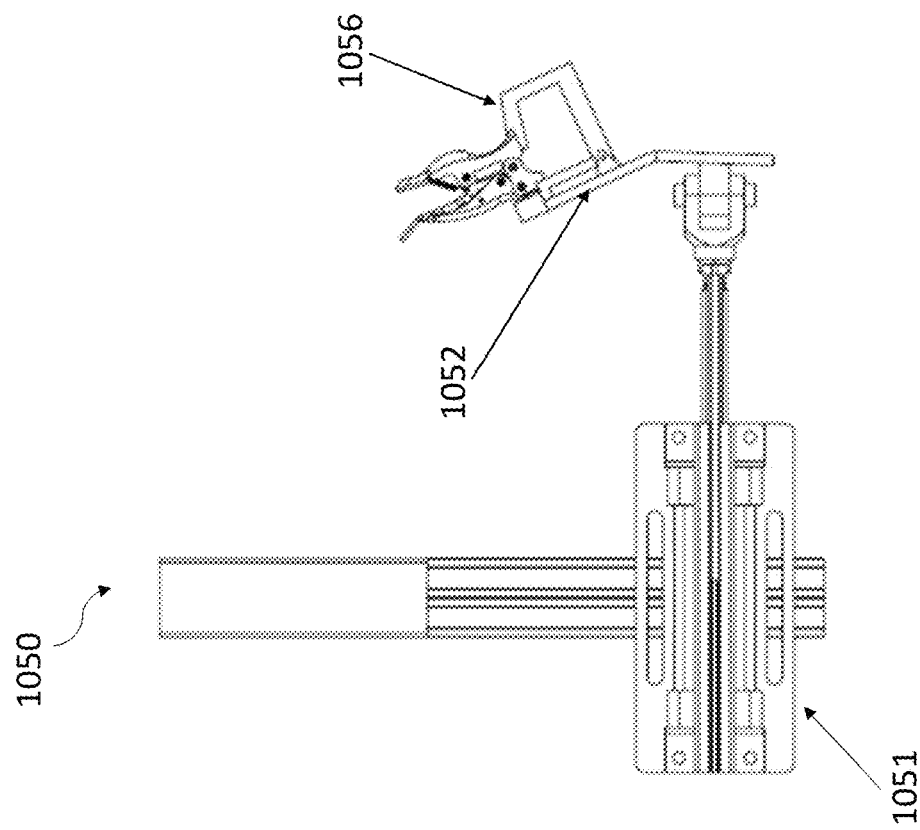
Figure 13:
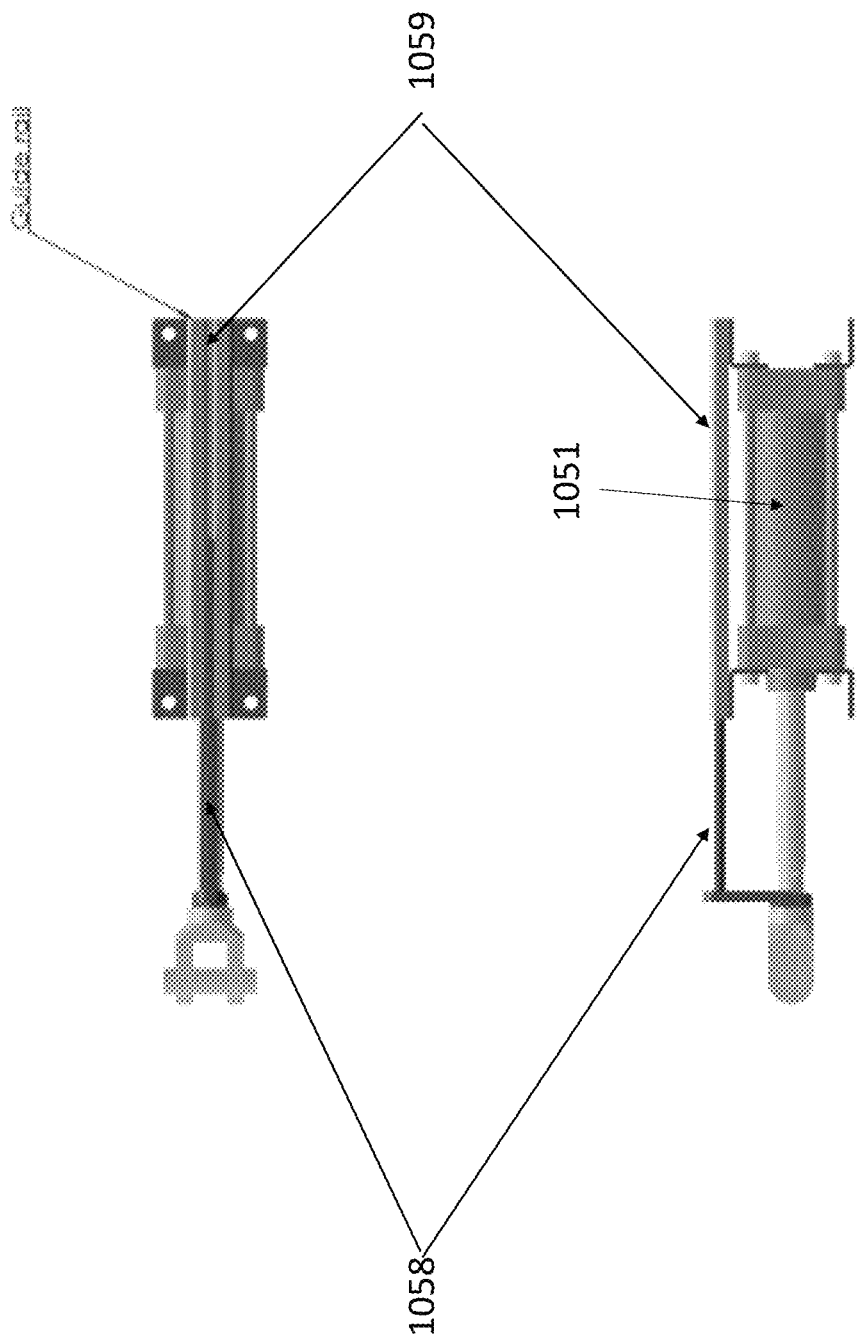
Figure 14:
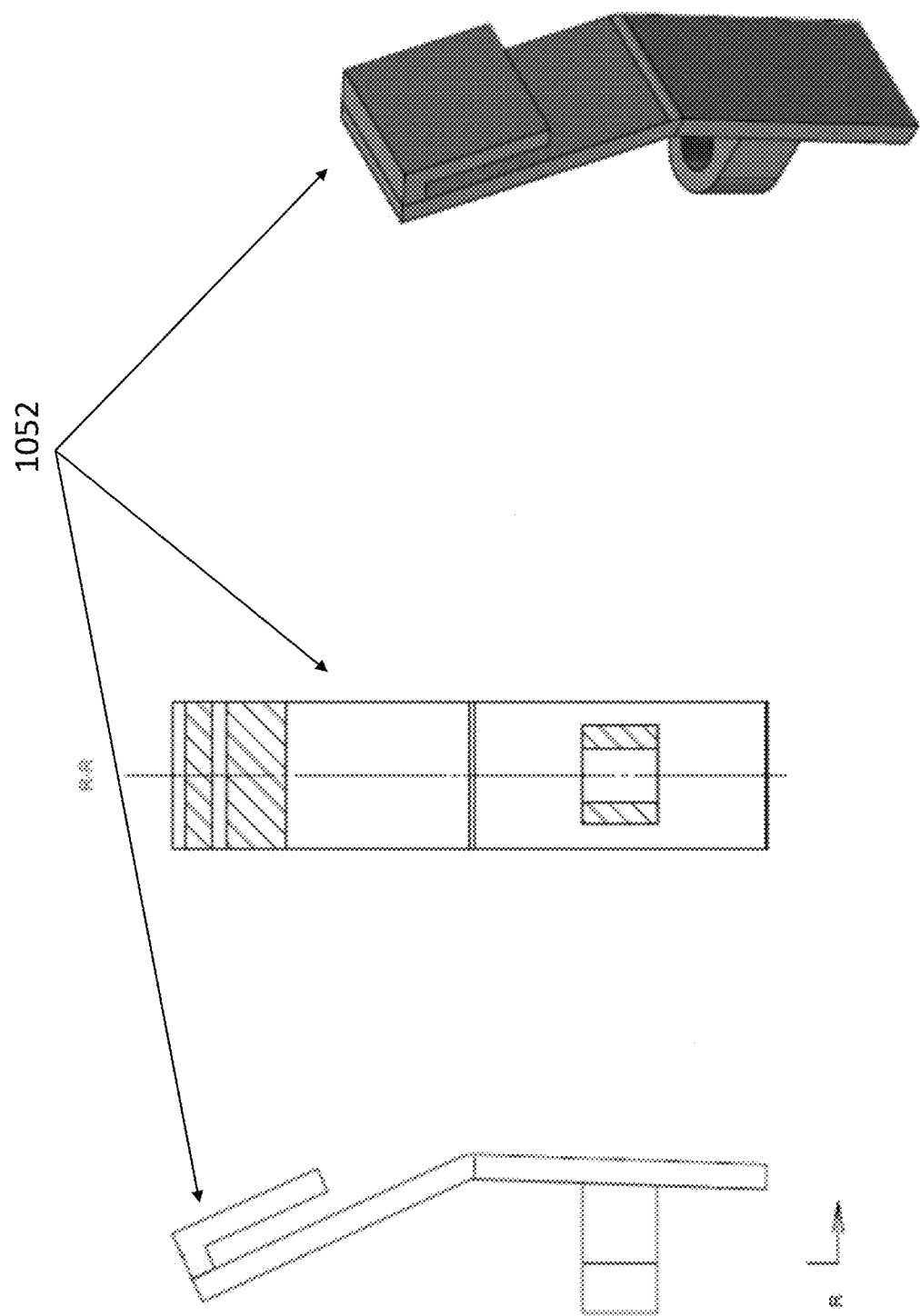
FIGS. 14-19 are exemplary views of templates of the assembly apparatus disclosed herein for holding the flatback.
Figure 15:
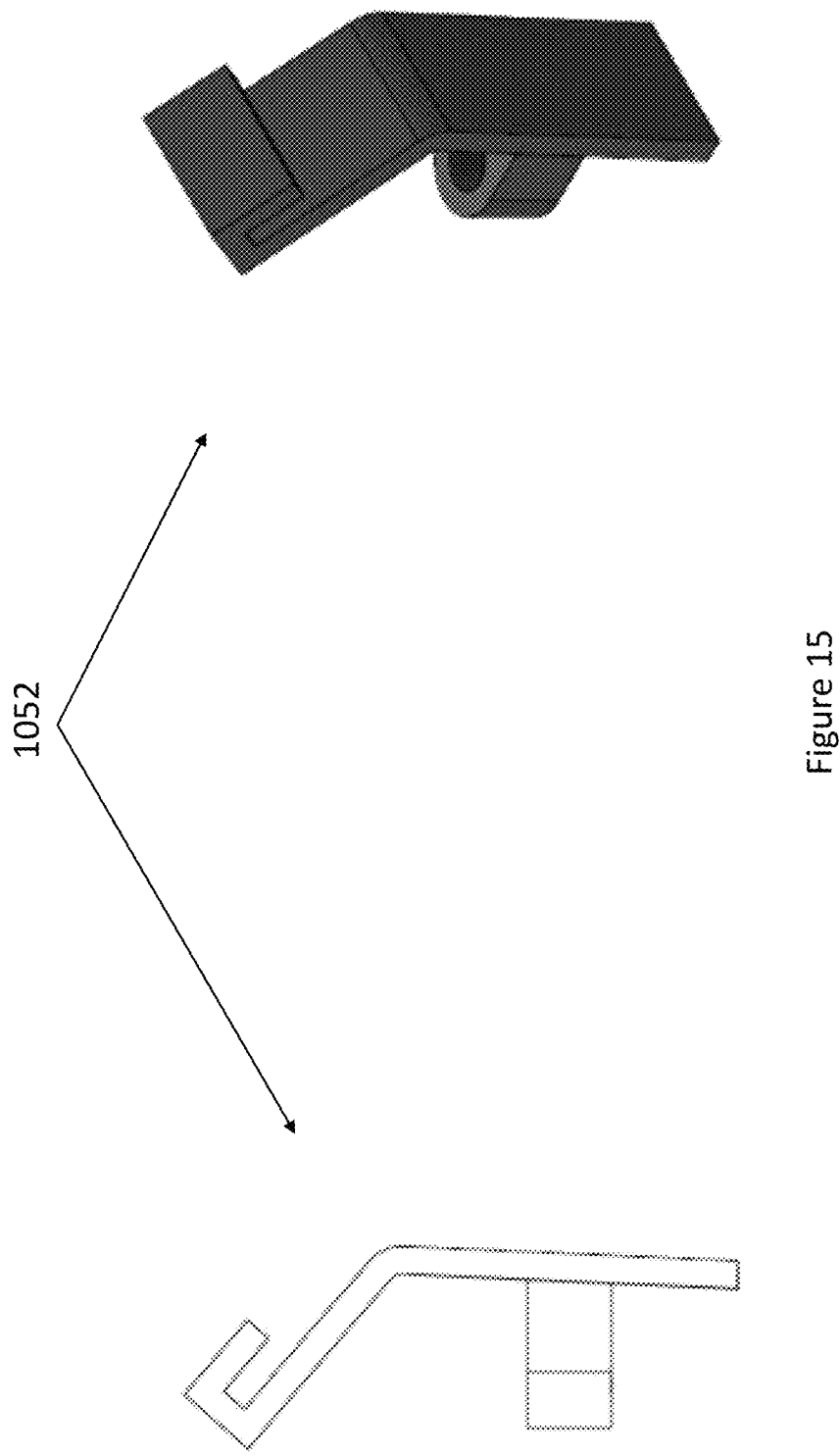
Figure 16:
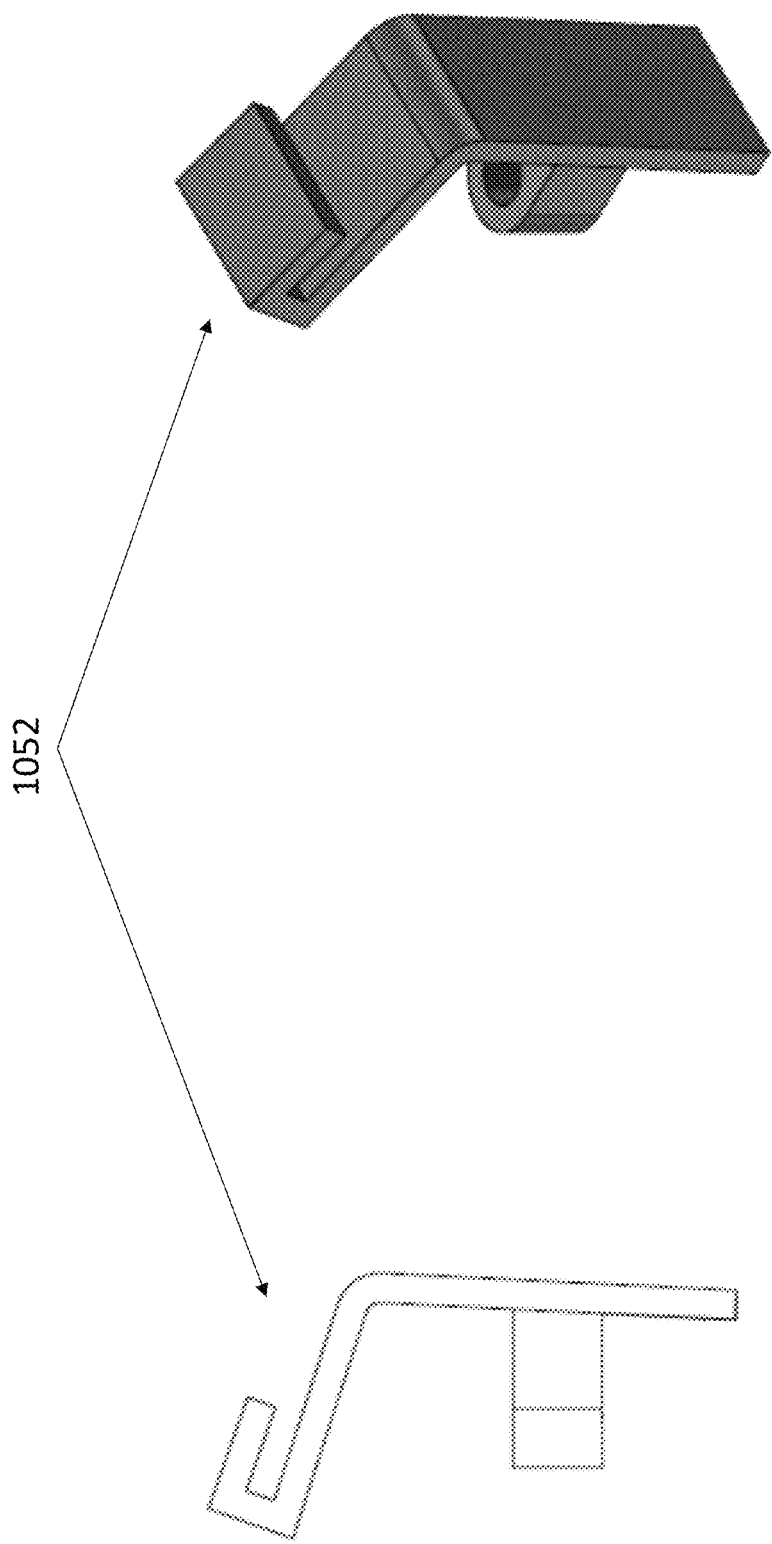
Figure 17:
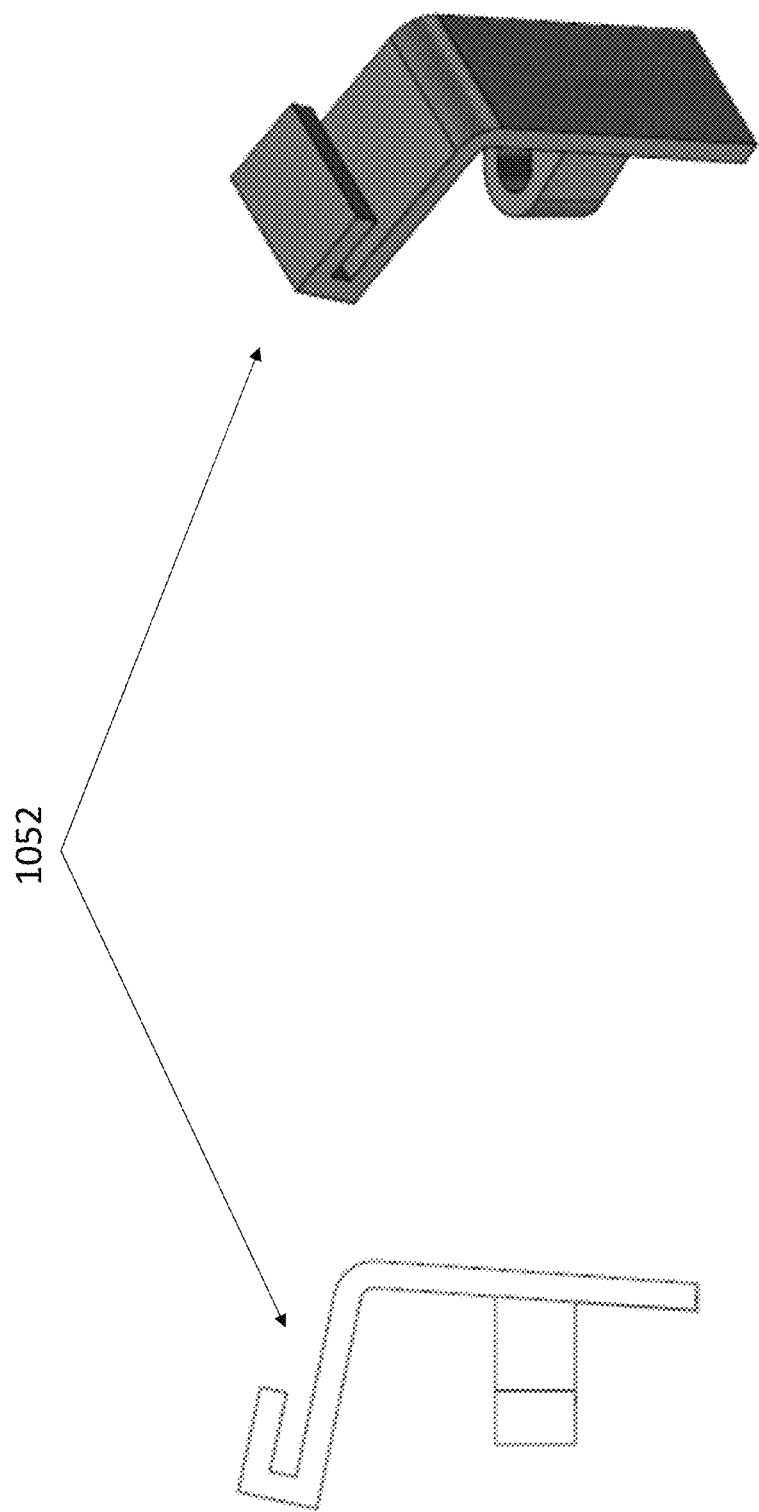
Figure 18:
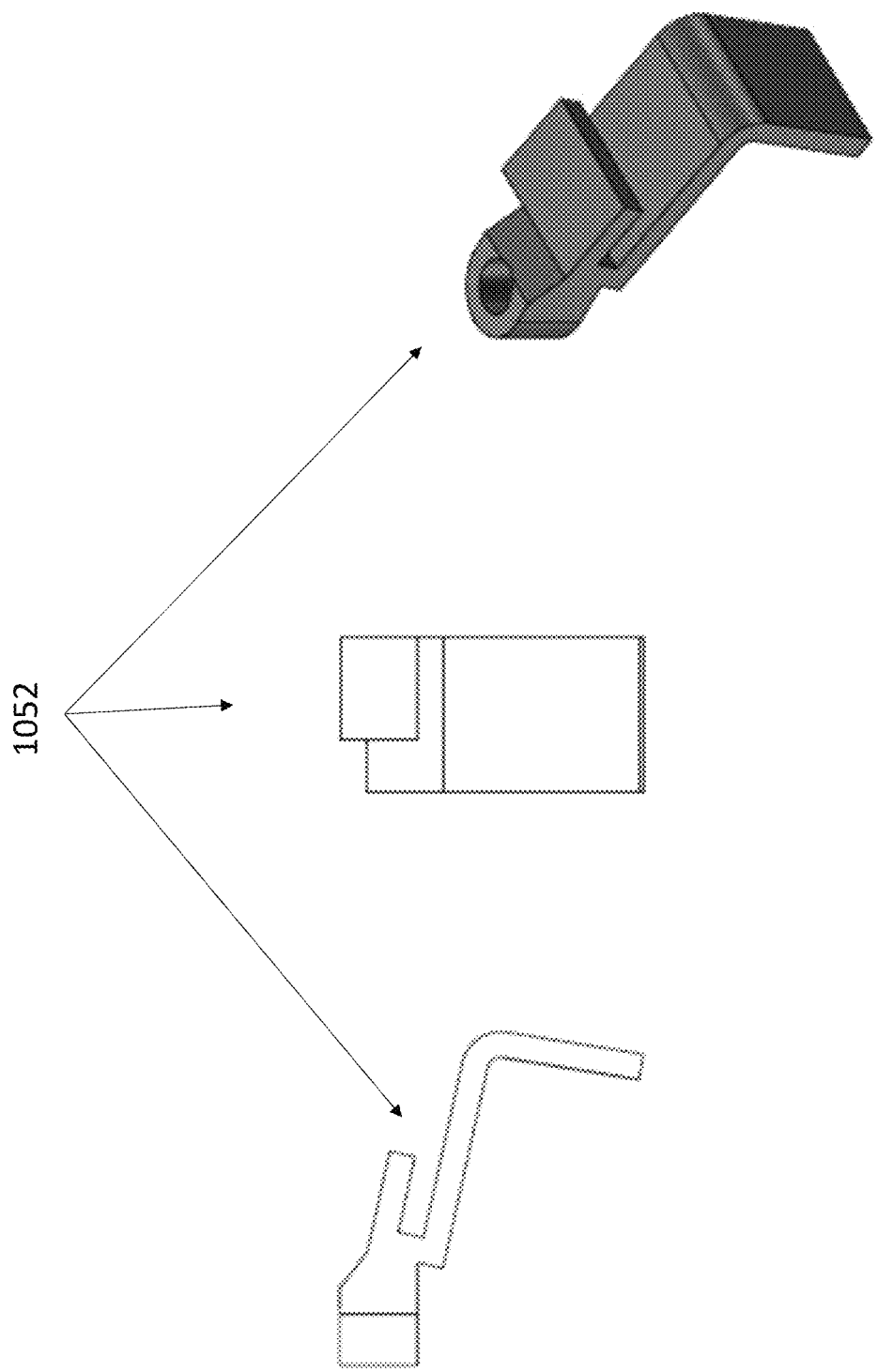
Figure 19:
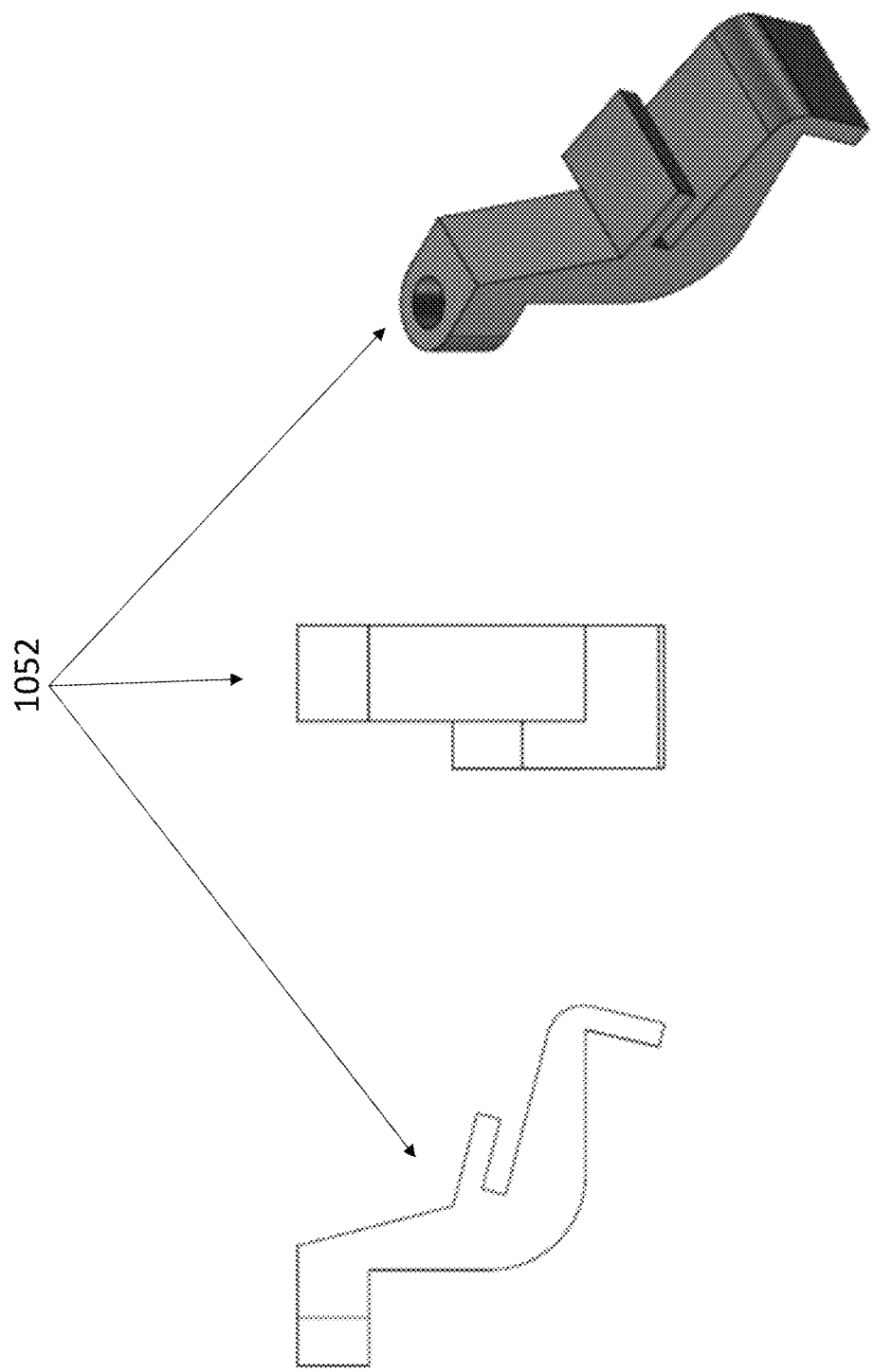
Figure 20:
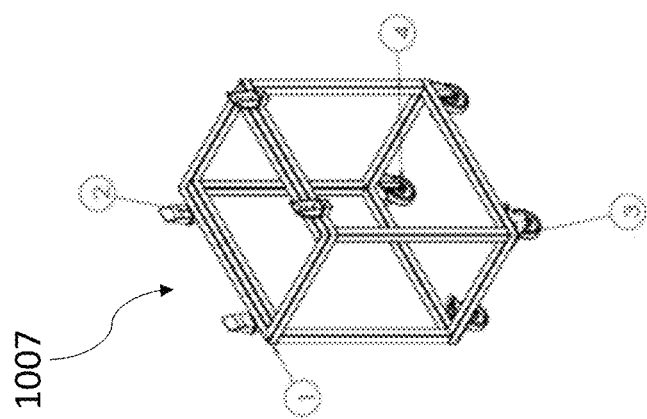
FIG. 20 is an exemplary view of the storage rack of the assembly apparatus disclosed herein.
Figure 20:
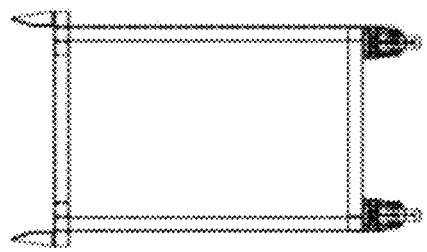
Figure 20:
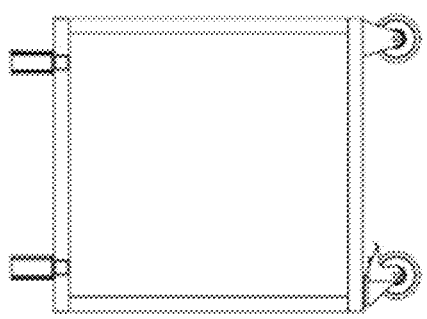
Figure 20:
Figure 21:
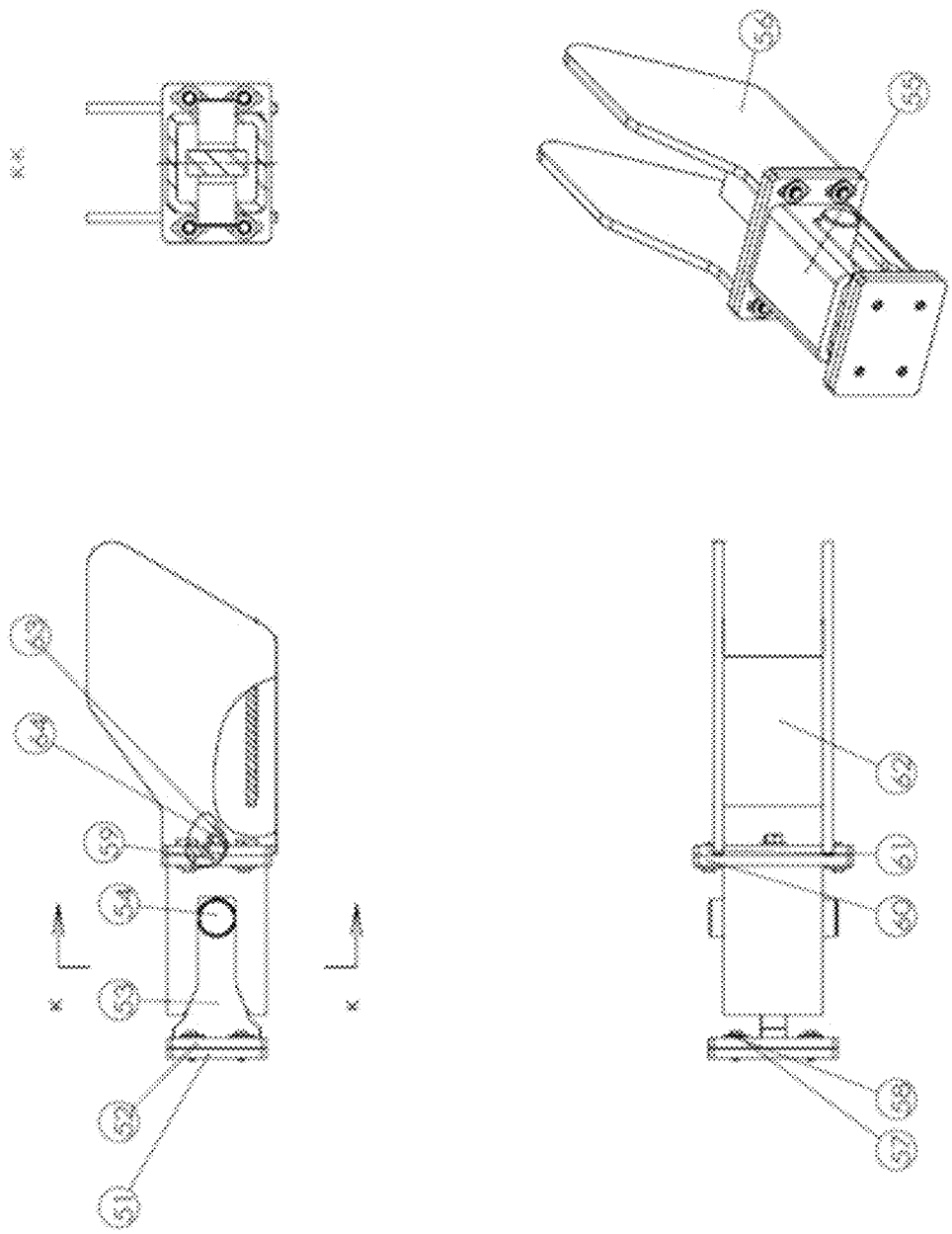
FIG. 21 is an exemplary view of a connecting member of a leg of the assembly apparatus disclosed herein for engaging a mold flange.

As shown in FIGS. 12-13, actuation guiders include a cylinder (1051) for powering the actuation movement. In some embodiments the cylinder can power movement by pneumatic or hydraulic source. In some embodiments the cylinder can power movement via an electronic source. At the end of the cylinder (1051) is template (1052) for holding the flatback insert (200). The template (1052) is configured with a complimentary contour to the flatback insert 200. Some exemplary embodiments of template (1052) designs are illustrated in FIGS. 14-19. A plurality of templates are disclosed in order to accommodate the compounding curves formed in the composite blade. In accordance with an aspect of the disclosure, the templates (1052) are designed to conform in a mating fashion with the shape and contour of the composite blade in order to ensure proper and even surface contact, prior to application of force from the piston 1051.

The actuation guiders (1050) also include a connection plate (1053) which can be releasably coupled to a truss of the main body (1001). Additionally, the connection plate (1053) can be releasably coupled to the actuation cylinder (1051). Accordingly, the actuation guider can be repositioned to any desired location along the length of the fixture. In some embodiments the connection plate (1053) can be configured as a housing which surrounds the actuation cylinder (1051). This plate allows for pitch and transverse adjustment of the actuation cylinder (1051) relative to the fixture frame. As shown in FIG. 12, a channel (1054) is formed where the plate (1053) can be attached. This allows for height adjustment of the plate (1053). Also, reference numeral (1055) denotes the main connection location for coupling to the body (1001) of the fixture.

As further shown in FIG. 12, the actuation guiders also include a clamp (1056) for releasably securing the flatback insert against the template (1052). The clamp (1056) can be configured with a geometry that interfaces with the template (1052) to lock the clamp in place with respect to the template (e.g. tongue and groove or dovetail engagement).

In operation, the piston within the cylinder (1051) is actuated (e.g. pneumatically) and driven to extend actuator arm (1058) through guide rail (1059) to force the template-flatback assembly towards the mold skin at the trailing edge. This applies a consistent force from the root to tip thereby preventing defects, e.g. past voids, from forming between the flatback insert and the blade skin. Additionally, the actuation guiders can maintain a consistent bonding gap due to the consistent and steady application of force from the root to the tip (or any desired subsection thereof). As shown in FIG. 1, a plurality of actuation guiders (1050) are included in the exemplary embodiment. These actuation guiders (1050) can be operated in tandem such that the same force is applied, simultaneously, across each actuation guiders. Additionally or alternatively, the actuation guiders can be operated independently of each other.

During operation, the flatback (200) is held on the top edge at the molded side. The bonding surface of the flatback (200) is devoid of any attachments or fixtures such that it remains free and unobstructed, and thus ready for bonding to the trailing edge of the blade. An adhesive guide (or "paste shoe") is positioned relative to the flatback and trailing edge to deliver adhesive/paste to the select locations according to the particular geometry of the flatback and trailing edge blade models. After the adhesive is applied, the actuators are operated to apply the compressive force to facilitate the dispersion of the adhesive between the flatback and the trailing edge, and apply a uniform force along the two structures.

Flatback Holder (1006)

Referring again to FIG. 1, the fixture includes a flatback holder (1006) which stages the flatback for positioning and bonding to the trailing edge.

In an exemplary embodiment, the non-bonding surface of the pressure side (PS) of the flatback (200) goes into the slot of the template (the appropriate template of FIGS. 14-19 selected and positioned according to blade type/geometry). Each template is angled for each specific location to follow the flatback (200) shape. The flatback (200) is locked to the template with the vice grip clamps (1056). Each template (1052) is attached to the actuator (1051), independently or as an interconnected series. The templates (1052) will hold the flatback (200) while the actuator cylinder (1051) extends to close the gap between flatback (200) and skin bonding surface. On the mold side, there are holders that opposes the actuator (1051) to keep the flatback (200) bonding surface flat against the skin bonding surface. As the flatback (200) is pushed against the skin surface and squeezes out the paste, there is the tendency of rotating the part due to the templates are attached to the upper part of the flatback (200). This induces a moment force, with the holders (1006) positioned to oppose this moment. The holders (1006) are positioned on the mold flange to avoid being contaminated with bonding paste as it is being squeezed out between flatback insert and blade skin during the bonding.

Flatback Storage Rack (1007)

A flatback storage rack (1007) is also included within the main fixture which can store one or more flatbacks locally at the point of assembly, thereby reducing cycle time and risk of injury by reducing the need for manual manipulation and loading of flatbacks from inventory.

In an exemplary embodiment, the storage rack (1007) can be configured as two carts with wheels that holds the flatback while not in use. Each cart are placed on either end of the flatback (200). The flatback (200) is installed while the fixture is on the cart to avoid working under load. The carts are also used to transport the flatback fixture to the nearest mold where flatback bonding is needed. This reduces the crane usage, DL, and cycle time.

In some embodiments the storage rack/casters can include programmable servomotors to drive the apparatus about the floor to predefined positions and for predefined durations of time. Additionally or alternatively, the storage rack/casters can include sensors which communicate with markers located on the shop floor to confirm proper positioning of the fixture, and signal an alarm if displaced.

Typically, the flatback (200) does not extend to the root of the pressure side of the mold/blade. In an exemplary embodiment, the flatback (200) starts where there is cylindrical shape transition to a fan shape in the blade/mold. The flatback (200) serves as the trailing edge of the blade to accommodate the hinging movement during operation, and bonds to the blade skins on the flatback's horizontal surfaces. The cylindrical shape of the blade is bonded through the vertical surfaces which is separate from the flatback.

In operation, the flatback (200) is located according to the blade specification by mating pre-positioned and calibrated receivers on the pressure side of the trailing edge of the mold. The calibration process can commence after set-up, which itself includes installation of the receivers to the mold frame to match the legs (1002) of the fixture and fixture assembly. Actuators are set-up to follow the shape of the flatback (200) wherein the holder attachment are welded to the mold frame. Calibration can be performed while there is an infused skin on pressure side mold, and includes:

1. With the fixture is disposed on receivers, adjusting the height and angle of the fixture. Here, adjustment is generated by the receivers, and a laser tracking system can be employed to ensure conformance with the 3D model.

2. Extending the actuators to full length and check the distance to the skin. Adjusting the distance of the actuators so that when the flatback fixture is pushed against the skin surface, there is still sufficient pressure to ensure paste is being forced out. In some embodiments, a 5 mm bonding gap can be maintained by putting spacers on flatback.

3. Adjusting the holders according to the setting of step 2.

4. Proceeding through the operation by using clay between the bonding surfaces to check for gaps.

5. Adjusting accordingly through the sliders and plate of the actuators and holders.

In accordance with another aspect of the disclosure, this fixture apparatus and operational method can operate independently of the shear web bonding processes, unless there is a shear web bonding processes specifically related to the pressure side.

Additionally, the flatback 200, one installed within a completed blade, can extend between the pressure side and suction side skins, such that the skins are spaced apart at the trailing edge to form a blunt trailing edge.

The preferred setting of the presently disclosed technique is in the manufacture of epoxy and polyester resin parts. While the exemplary embodiment focuses on wind turbine blade manufacture, this process can be used in the fabrication of other composite parts e.g., marine, transportation, rides, sculpture, aircraft/military, civil infrastructure, construction, appliance/business, consumer, corrosion-resistant equipment, and electrical component installations.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. An apparatus for assembling wind turbine blade components comprising:
    a main body portion, the main body portion including a plurality of interconnected struts;
    at least one arm, the at least one arm including a plurality of interconnected struts, the at least one arm configured to engage a leading edge of a mold;
    at least one leg, the at least one leg including a plurality of interconnected struts, the at least one leg configured to engage a trailing edge of the mold;
    a template, the template configured to hold a blade component;
    an actuator, the actuator configured to apply a force to the blade component.

2. The apparatus of claim 1, wherein the blade component is a flatback insert.

3. The apparatus of claim 1, wherein the force applied by the actuator is directed towards the trailing edge of the blade component.

4. The apparatus of claim 1, wherein the at least one arm can rotate with respect to the main body portion.

5. The apparatus of claim 1, wherein the at least one arm includes two arms, the first arm disposed at a first end of the main body portion, the second arm spaced from the first arm and having a greater length than the first arm.

6. The apparatus of claim 1, wherein the at least one leg is longitudinally spaced from the at least one arm.

7. The apparatus of claim 1, wherein the at least one leg is removably attached to the main body portion.

8. The apparatus of claim 1, further comprising shackles on a top surface of the main body portion, the shackles configured to engage a vertical hoist mechanism.

9. The apparatus of claim 1, wherein the main body portion has a first side and a second side, both the first and second sides disposed interior of the leading and trailing edges of the mold.

10. The apparatus of claim 1, wherein the at least one actuator is connected to a bottom surface of the main body portion.

11. The apparatus of claim 10, wherein the at least one actuator is connected to the template.

12. The apparatus of claim 10, wherein the at least one actuator includes a plurality of actuators each disposed equidistantly from adjacent actuators.

13. The apparatus of claim 10, wherein the at least one actuator is a pneumatic piston.

14. The apparatus of claim 10, wherein the at least one actuator is disposed between the leading edge and trailing edge.

15. The apparatus of claim 10, wherein the at least one actuator is adjustable in distance relative to the main body portion.

16. The apparatus of claim 1, wherein the template engages the blade component along a top edge thereof.

17. The apparatus of claim 1, further comprising a blade component holder, the blade component holder connected to a bottom of the main body portion.

18. The apparatus of claim 1, wherein the at least one leg extends laterally from the main body portion.

19. The apparatus of claim 1, wherein the at least one arm extends laterally from the main body portion.

20. The apparatus of claim 1, wherein the main body portion, the at least one arm and the at least one leg are discrete assemblies.

* * * * *